United States Patent
Schweigert et al.

(10) Patent No.: US 7,742,305 B2
(45) Date of Patent: Jun. 22, 2010

(54) SWITCHING POWER SUPPLY UNIT

(75) Inventors: Harald Schweigert, Vienna (AT);
Harald Weinmeier, Vienna (AT)

(73) Assignee: Siemens AG Osterreich, Vienna (AT)

( * ) Notice: Subject to any disclaimer, the term of this patent is extended or adjusted under 35 U.S.C. 154(b) by 1306 days.

(21) Appl. No.: 11/083,501

(22) Filed: Mar. 18, 2005

(65) Prior Publication Data

US 2005/0190517 A1   Sep. 1, 2005

(30) Foreign Application Priority Data

Sep. 20, 2002   (AT)   ............... A 1420/2002
Sep. 18, 2003   (AT)   ....... PCT/AT03/00278

(51) Int. Cl.
*H02H 5/04*   (2006.01)
*H05K 7/20*   (2006.01)

(52) U.S. Cl. ............ 361/704; 361/93.8; 361/103
(58) Field of Classification Search ............... 361/93.8, 361/103, 704, 93.1; 323/282
See application file for complete search history.

(56) References Cited

U.S. PATENT DOCUMENTS

| | | | |
|---|---|---|---|
| 4,245,286 A * | 1/1981 | Paulkovich et al. | 363/21.11 |
| 4,727,450 A * | 2/1988 | Fachinetti et al. | 361/103 |
| 5,283,708 A | 2/1994 | Waltz | |
| 5,373,205 A * | 12/1994 | Busick et al. | 327/378 |
| 5,465,011 A * | 11/1995 | Miller et al. | 307/64 |
| 5,610,453 A | 3/1997 | Smith | |
| 6,198,245 B1 * | 3/2001 | Du et al. | 318/471 |
| 2003/0156365 A1 | 8/2003 | Kranister et al. | |
| 2005/0029952 A1 | 2/2005 | Schweigert et al. | |
| 2005/0168189 A1 | 8/2005 | Schweigert | |
| 2005/0190515 A1 | 9/2005 | Hallak et al. | |

FOREIGN PATENT DOCUMENTS

| | | |
|---|---|---|
| EP | 0792008 A | 8/1997 |
| WO | WO 02 07295 A | 1/2002 |

OTHER PUBLICATIONS

International Search Report, PCT/AT03/00278 mailed Feb. 12, 2004 (4 pages).

* cited by examiner

*Primary Examiner*—Bao Q Vu
*Assistant Examiner*—Jue Zhang
(74) *Attorney, Agent, or Firm*—Staas & Halsey LLP

(57) ABSTRACT

A switching power supply having at least one switch (S) controlled by a control circuit (AST), by means of which an input direct voltage ($U_V$) is switched, whereby a thermal model (THM) is implemented in a control (STE), by means of which the temperature of at least one component (S; D3, D4, UET) can be calculated or estimated, and at least one current value that is load-dependent is made available as an electrical quantity to the thermal model, the control (STE) is directed at outputting at least one limiting signal (abs, ala) when a limiting value or a function of multiple limiting values depending on calculated or estimated temperature values is reached, which is usable in the sense of an action to reduce temperature, and which produces at least one limiting signal (abs) to the control circuit in the sense of a temperature reduction and thus a power reduction.

20 Claims, 2 Drawing Sheets

SWITCHING POWER SUPPLY UNIT

TITLE OF INVENTION

CROSS-REFERENCE TO RELATED APPLICATION

This application claims priority from PCT patent application Ser. No. PCT/AT03/00278 filed 18 Sep. 2003, which claims priority from Austrian Patent Application A 1420/2002, filed 20 Sep. 2002.

FIELD OF THE INVENTION

The invention concerns a switching power supply to supply a load with a controlled output voltage/output current and having at least one switch controlled by a control circuit, by means of which an input direct voltage is switched, and having a cutoff control for overload conditions.

With respect to the invention, a switching power supply means any kind of power supply which also contains switched, i.e., clocked semiconductor components and which generates a direct or alternating output voltage controlled in the usual manner, from a direct or alternating voltage, usually from a power line alternating voltage, to feed one or more loads. In particular, the invention considers switching power supplies that produce a regulated output direct voltage of 40 volts, for example, from an unregulated alternating voltage of 230/400 volts, for example.

BACKGROUND OF THE INVENTION

In dimensioning of switching power supplies, especially those for industrial controls, calculation of the power consumption is a substantial expense if it is possible at all. Usually, only an estimate is possible, because the peak power consumption depends primarily on the control program that is running. Because of that, power supplies are often massively over-dimensioned, resulting, certainly, in higher costs and greater requirement for space.

Switching power supplies generally have a maximum output power which is, for instance, set at a fixed level by a current limiter, whereby the maximum output power is available as a continuous rating. In so doing, one assumes a maximum ambient temperature. At the state of the art, power supplies are known which can produce output currents or powers greater than the nominal value for short times. For instance, they can produce 3 times the nominal current for 25 ms. It has also become known that power supplies can be built so that they can provide a higher output power, e.g., 10 to 30% higher, at low ambient temperature ("derating").

Transient overloads can also be supplied by batteries connected in parallel with the output; but that solution is quite disadvantageous because the lifetime and cost of the batteries must be considered, and a separate cutoff device to protect against deep discharge is also necessary, such as a special load circuit; and they have substantial volume and weight, aside from the cost.

The fundamental consideration of thermal capacities for fused supply of electrical loads is often recognized and is already accomplished in principle by fuses with slow response adapted to the load. For example, U.S. Pat. No. 5,283,708 A shows an electronic protection for an electrical motor connected to a three-phase line, which is to be protected against long-term load above the nominal load. In this system the current temperature of the motor can be calculated and applied for switching the motor off.

However, the problem on which the invention is based is not protection of a load and consideration of its characteristics, but provision of a switching power supply at a favorable price.

Then one objective of the invention is provision of a switching power supply with which unnecessarily high costs due to overdimensioning can be avoided and, in particular, intelligent adaptation to the existing situation, especially the load and temperature situation, is possible.

This problem is solved with a switching power supply of the type stated initially, in which, according to the invention, there is a control in which a thermal model is implemented, by means of which the temperature of at least one part can be calculated or estimated, whereby a load-dependent current value is made available to the thermal model as an electrical quantity, and the control is directed to producing at least one limiting signal when a limiting value that can be preset is reached, or a function of multiple limits, which limiting signal can be utilized in the sense of an interruption for temperature reduction, and at least one limiting signal can be sent to the control circuit, which acts on the control circuit in the sense of temperature reduction and thus power reduction.

Due to the invention, it is possible to provide a switching power supply which has only a relatively small structural size and lower costs than the usual power supplies, because it is dimensioned only for the average power consumption. In practice, one can actually reduce the dimensioning to about half the nominal power. The only added costs are those concerning the temperature monitoring.

In one practical variant it is provided that a limiting signal is used to cut off the power supply on the primary and secondary sides.

It is particularly convenient for a limiting signal to be used to control a cooling/ventilating device. In that way it is possible to prevent, or at least to delay, cutting off the power supply in the case of a transient overload.

In many cases it is desirable to use a limiting signal as an alarm signal because the user can take appropriate steps to avoid or reduce damage.

In preferred variants, it is provided that there is at least one temperature sensor to determine temperatures relevant to/for the power supply, whereby the signal from at least one temperature sensor can be used in the thermal model. In contrast to other operating parameter values, the temperature values are of direct and clear importance for an overload state of the power supply. It can be appropriate, if a temperature sensor is provided for the ambient temperature for the power supply or if a temperature sensor is provided to determine the temperature of a semiconductor component and/or its thermally relevant environment, or if a temperature sensor is provided to determine the temperature of a transformer and/or its thermally relevant environment.

On the other hand, it is appropriate in many cases if at least the output current from the power supply is provided to the thermal model as an electrical quantity, or if the primary current is provided to the thermal model as an electrical quantity. The thermal model can, from such current values, make an estimate of, for example, the chip temperature of power semiconductors.

In another variant, it can be provided for the thermal model to contain stored thermal time constants of individual parts which are taken into consideration in the calculation/estimation of component temperatures. In this way, the delay between an actual semiconductor (chip) temperature and, for instance, the housing or heat sink temperature, which is often substantial, can be taken into consideration. Here it is particularly effective if the thermal model is directed at continuously calculating the temperatures of components, considering the stored time constants.

Another variant, which can be accomplished simply, is characterized in that the thermal model contains a list of possible combinations of assignments of operating parameter values and limiting signals and the control circuit is aimed at selecting and outputting at least one limiting signal corresponding to measurements from this list.

Designs in which the control system contains at least one digital processor are particularly capable.

On the other hand, it is possible for the control system to be designed at least in part as an analog system. One can construct a thermal model, especially a simplified one, from operational amplifiers, resistances and capacitors.

BRIEF DESCRIPTION OF THE DRAWINGS

The invention, and other advantages, are explained in more detail in the following by means of embodiments clarified in the drawing. In the drawing.

DETAILED DESCRIPTION OF THE INVENTION

Figure 1:
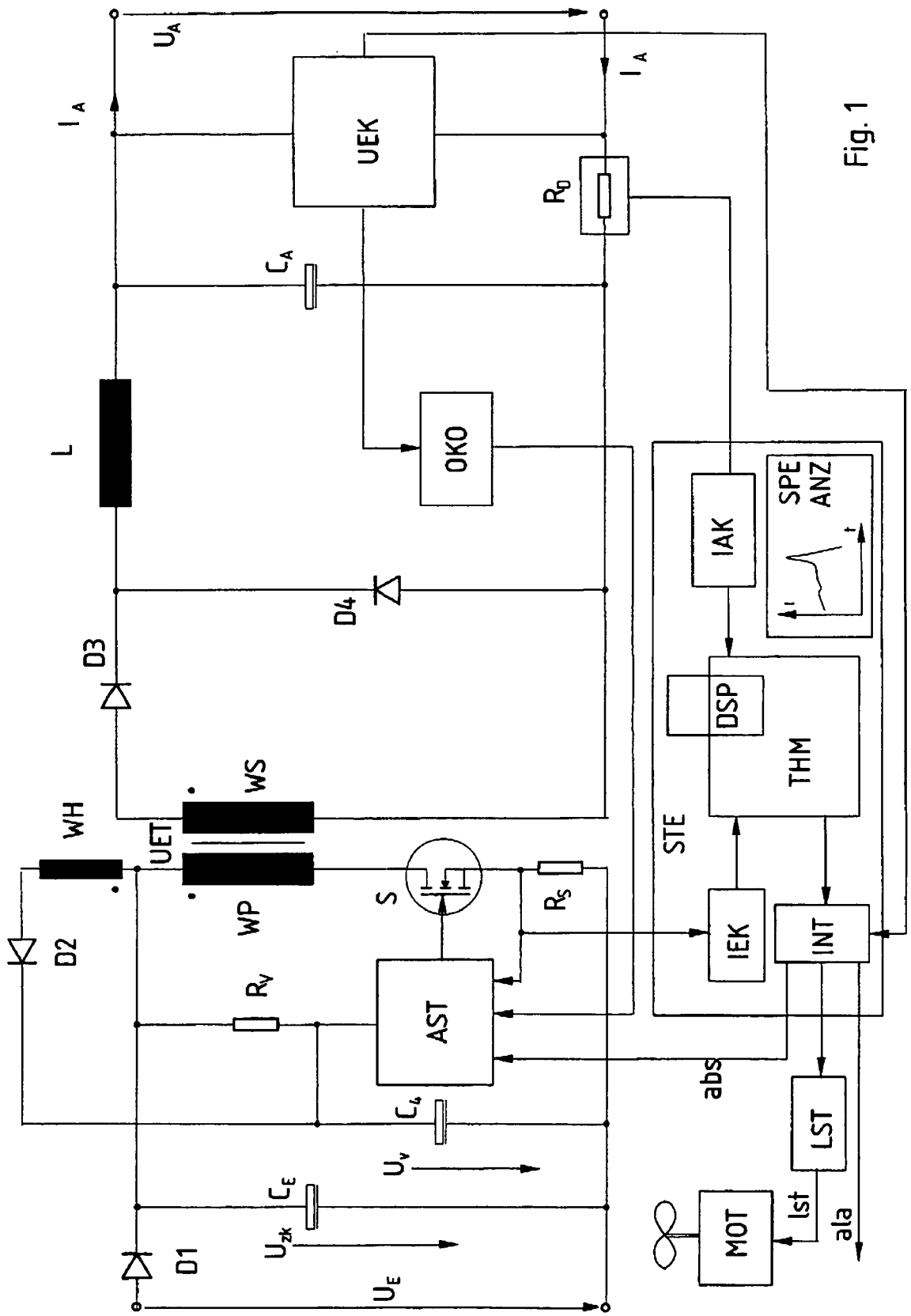
FIG. 1 shows the basic circuit diagram of a power supply designed according to the invention as a switching converter.

As shown in FIG. 1, an input voltage $U_E$ is rectified by a rectifier D1 and the rectified voltage $U_{ZK}$, applied to a capacitor $C_E$, is led through a controlled switch to the primary winding WP of a transformer UET. A sensor resistance $R_S$ is in series with the controlled switch to determine the primary current.

The controlled switch S is controlled by a control circuit AST, which provides a signal, pulse-width-modulated in the usual manner, of constant or even variable frequency. The control circuit is supplied with a voltage $U_V$ from an auxiliary winding WH and an auxiliary rectifier D2. The voltage is applied to a capacitor C4. A relatively high-resistance resistor RV to which the voltage $U_{ZK}$ is applied serves for starting the circuit.

At the secondary side, the voltage on a secondary winding WS is rectified, using, for instance, diodes D3 and D4 and an inductance L, with the converter, in this case, being built on the flux converter principle. Here it should be noted that, obviously, flux converters or mixed converter types can also be used in connection with the invention.

The rectified output voltage $U_A$ is applied to a capacitor $C_A$. A voltage detection circuit UEK on the secondary side provides information about the output voltage through an opto-coupler OKO to the control circuit AST, so that output voltage can be regulated at a fixed value. Similarly, but not shown here, it is possible to provide information about the output current $I_A$ to the control circuit AST if, for example, a secondary current regulation is desired.

In the present case the output current $I_A$ is determined by a series resistance $R_D$ and supplied to a current detection unit IAK of a control STE. Other possibilities for current measurement, as through a current transformer, are also possible.

The sensor resistance $R_S$ at the primary side provides the course of the primary current for the control circuit AST in the known manner, and also provides a signal to a current detection unit IEK of the control STE. This STE circuit contains a thermal model THM which, in the present case, contains information about the output current and about the input current.

The thermal model THM calculates the temperatures of critical components, such as the diodes D3 and D4 or the switch S, or estimates those temperatures, from the values of the output current or, optionally, the input current. The thermal time constants, details of the heat sink, etc., are also considered in the thermal model THM. The temperatures in the windings of the transformer UET can, for instance, also be calculated/estimated using the thermal model THM, along with the semiconductor temperatures.

As soon as the circuit, using the thermal model, establishes that temperature limits, which can be specified, or critical combinations of such limits, have been reached, it produces at least one limit signal, in the present case, through an interface INT. Limit signals that are output can, also in different sequences, initiate various processes. For example, a signal 1st can first be output to a blower control LST, turning on or increasing the speed of the motor MOT of a blower, so as to force cooling of the temperature of certain components or the interior of a power supply housing by means of this blower. To the extent that this measure itself results in the temperatures or combinations of temperatures to drop below their critical values, nothing else will happen, or the blower control will be turned off again after some time. Even at the time when the blower control is activated, of course, an alarm signal asa can be output, to a control computer, for instance, or to a warning lamp. In case starting the blower has no effect, then a shut-down signal abs can be output to the circuit AST which lowers the power of the switching power supply, to stand-by operation, for instance, until the overload situation is eliminated.

It can be convenient for the user for the STE circuit also to contain a memory SPE together with a display ANZ, which displays a record of the current I particularly before the shut-down time. It can, for example, display a period of time t of 10 to 100 seconds. The user can decide about possible causes for the shutdown from this display.

Figure 2:
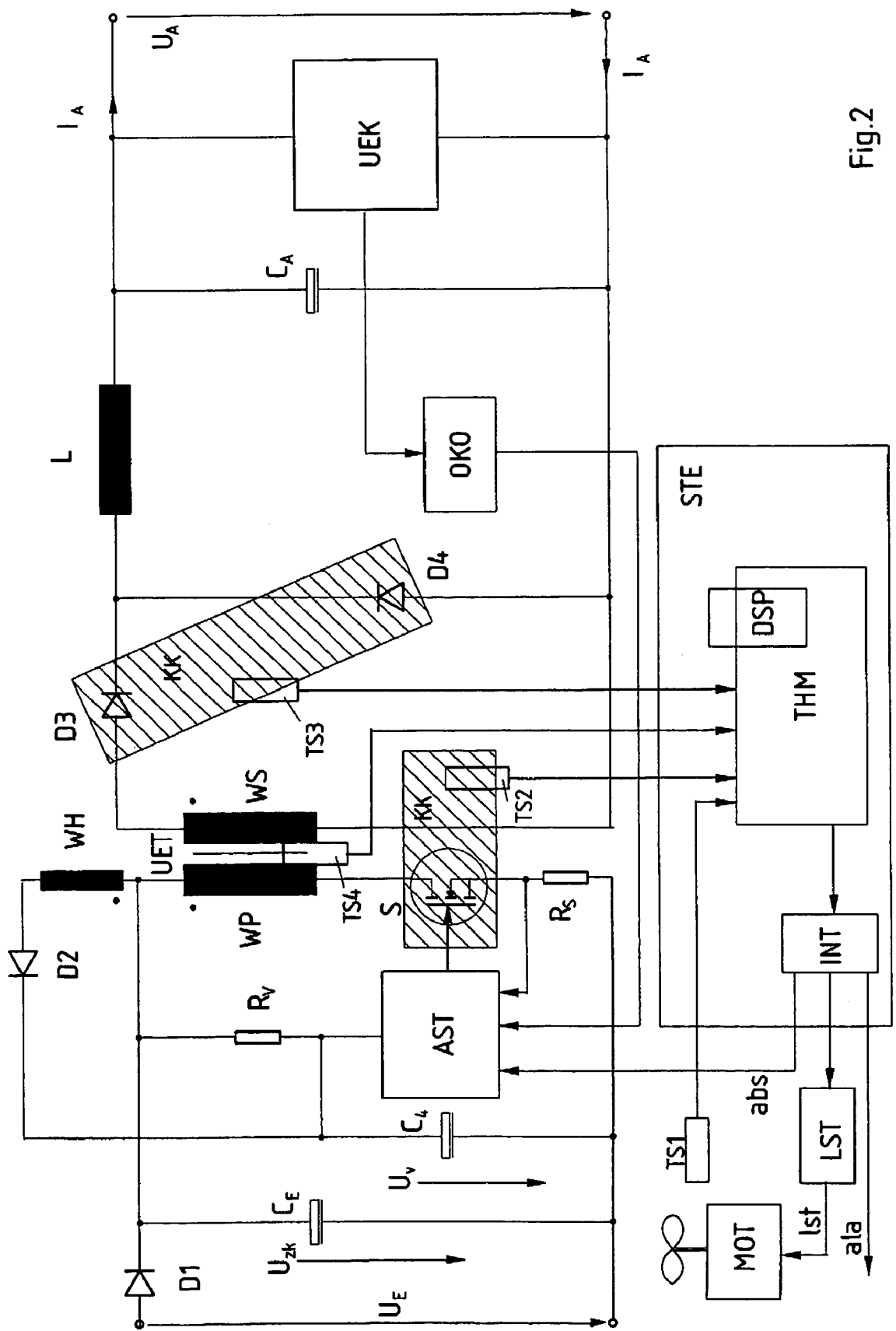
FIG. 2 shows another possible embodiment, also in a basic circuit diagram.

The embodiment shown in FIG. 2 corresponds to its design as a flux converter to that shown in FIG. 1. It differs from the embodiment of FIG. 1, though, in that the thermal model THM is not based on electrical quantities of the power supply, but on temperatures measured with temperature sensors assigned to different components of the power supply.

In particular a temperature sensor TS1, which determines the room temperature or the ambient temperature of the power supply is provided next. Here another temperature sensor TS2 measures the temperature of a heat sink KK of the primary switch S. A temperature sensor TS3 measures the temperature of a heat sink KK which is common to the secondary diodes D3 and D4, and a temperature sensor TS4 which has, for instance, a thermally conductive link to the core of transformer UET, is assigned to the transformer UET.

Using the temperatures determined, the control, by means of the thermal model, can calculate or estimate the actual critical temperature value, such as the chip temperature of a semiconductor or the winding temperature of the transformer, and then output the previously discussed limiting signal or other appropriate signals if the limiting value, which can be specified in advance, or a critical combination of such limits, is reached.

With respect to temperature measurement, it must be noted that the actual critical temperatures can never be measured with reasonable cost, especially the temperatures on the chip of a semiconductor. It would be necessary to drill down into the various components, posing special requirements for insulation of the temperature sensors. Therefore temperatures related to the particular components are measured, such as the housing temperature of a semiconductor or the temperature at a certain point on a semiconductor heat sink. Even with a transformer, it can often be difficult to measure the winding temperature or the core temperature, so that, for example, one measures the circuit board temperature at the electrical connections to a transformer. The thermal model includes all those parameters needed to be able to determine the relevant, i.e., the critical, temperatures reliably and time-dependently, from the temperatures actually measured. In this respect one should note the heat transfer resistance and the thermal time constants. It is also known that both the load current and the input voltage are important for heating of the transformer; the load current because of the copper losses, and the input voltage because of the capacitive losses linked with increasing input voltage. This can also be taken into consideration, and it is shown in FIG. 2 that the input voltage and the input current are provided to the thermal model as parameters.

For example, in order to be able to determine the actual diode temperature of one of diodes D3 or D4 accurately, a signal derived from the known load current is added to the actually measured heat sink temperature. For a particular embodiment, for instance, each ampere of load current can have the effect of adding a signal to the heat sink measurement that makes that measurement appear two degrees Kelvin higher. Than can be taken into consideration appropriately for the transformer.

It should also be noted that other combinations aside from the possibilities shown in FIGS. 1 and 2 for determining operating parameters can also be used. For example, one can provide all the electrical quantities from the primary and secondary sides to the thermal model, and even a larger number of temperature values. Of course, one must make an appropriate economic choice according to the situation, considering, for instance, whether the optocoupler or other isolating measures which increase the cost of the design are necessary for the transmission.

In general, the control STE or the thermal model THM will contain a digital processor DSP, which, for instance, makes it possible to include permanently the heating of one or more parts. To be sure, that involves relatively high computing capability, as the thermal model must be updated often, e.g., several times per second.

Another possibility is to establish a list of the possible combinations of possible operating parameter values in an EPROM. Then the processor need only find the appropriate parameter list and carry out the command stored there. Such a list can, for example, contain a hundred "IF" instructions, such as the following:

"IF" ambient temperature <20° C. "AND" load current<1.2 $i_{nominal}$, "THEN" warning signal in 32 seconds.

Control with the thermal model is fundamentally not tied to a digital processor DSP. Rather, the entire thermal model can also be simulated in analog form with operational amplifiers, capacitors and resistors. In general, though, that is more expensive and is not favorable with the desirable processors now available.

What is claimed is:

1. A switching power supply to supply a load with a controlled output voltage and output current and having at least one switch controlled by a switch control circuit, by which an input direct voltage is switched, and having a cut-off control for overload conditions, comprising:

a control circuit using a thermal model to obtain a calculated temperature of at least one component of the switching power supply based on at least one current value that is load-dependent and is available as an electrical quantity, said control circuit outputting to the switch control circuit at least one limit signal when at least one limit of the calculated temperature values is reached, the switch control circuit thereby reducing operational temperature of the switching power supply and thus the power.

2. A switching power supply according to claim 1, characterized in that a limiting signal (abs) is used to cut off the primary/secondary side of the switching power supply.

3. A switching power supply according to claim 1, characterized in that a limiting signal (1st) is used to control a cooling/ventilating device.

4. A switching power supply according to claim 1, characterized in that a limiting signal (ala) is used as an alarm signal.

5. A switching power supply according to claim 1, characterized in that at least one temperature sensor (TS1 . . . TS4) is provided to determine relevant temperatures of/for the power supply, whereby the signal of at least one temperature sensor can be provided to the thermal model (THM).

6. A switching power supply according to claim 5, characterized in that a temperature sensor (TS1) is provided for the ambient temperature of the power supply.

7. A switching power supply according to claim 5, characterized in that a temperature sensor (TS2, TS3) is provided to determine the temperature of a semiconductor component and/or its thermally relevant environment.

8. A switching power supply according to claim 5, characterized in that a temperature sensor (TS4) is provided to determine the temperature of a transformer (UET) and/or its thermally relevant environment.

9. A switching power supply according to claim 1, characterized in that at least the output current ($I_A$) of the switching power supply is made available as an electrical quantity to the thermal model (THM).

10. A switching power supply according to claim 1 with a potential-isolating transformer, characterized in that the primary current is made available as an electrical quantity to the thermal model.

11. A switching power supply according to claim 1, characterized in that the thermal model (THM) contains stored thermal time constants of individual components which are considered in calculating/estimating component temperatures.

12. A switching power supply according to claim 11, characterized in that the thermal model (THM) is directed at continuous calculation of the temperature of components considering the stored thermal time constants.

13. A switching power supply according to claim 1, characterized in that the thermal model (THM) contains a list of possible combinations of assignments of operating parameter values and limiting signals and the control is directed at selecting and outputting at least one limiting signal corresponding to measurements from this list.

14. A switching power supply according to claim 1, characterized in that the control circuit contains at least one digital processor.

15. A switching power supply according to claim 1, characterized in that the control is of at least partial analog construction.

16. A switching power supply according to claim 2, characterized in that a limiting signal (1st) is used to control a cooling/ventilating device.

17. A switching power supply according to claim 2, characterized in that a limiting signal (ala) is used as an alarm signal.

18. A switching power supply according to claim 3, characterized in that a limiting signal (ala) is used as an alarm signal.

19. A switching power supply according to claim 2, characterized in that at least one temperature sensor (TS1 ... TS4) is provided to determine relevant temperatures of/for the power supply, whereby the signal of at least one temperature sensor can be provided to the thermal model (THM).

20. A switching power supply according to claim 3, characterized in that at least one temperature sensor (TS1 ... TS4) is provided to determine relevant temperatures of/for the power supply, whereby the signal of at least one temperature sensor can be provided to the thermal model (THM).

* * * * *